United States Patent [19]

McFadden et al.

[11] 4,272,621
[45] Jun. 9, 1981

[54] WATER THINNABLE COATING COMPOSITIONS FROM AMINOALKYLATED INTERPOLYMERS

[75] Inventors: Russell T. McFadden, Freeport; Reuben L. Krause, Angelton, both of Tex.; R. Gregg Young, Midland, Mich.

[73] Assignee: The Dow Chemical Company, Midland, Mich.

[21] Appl. No.: 103,330

[22] Filed: Dec. 14, 1979

Related U.S. Application Data

[63] Continuation-in-part of Ser. No. 954,256, Oct. 24, 1978, abandoned.

[51] Int. Cl.³ .............................................. C08F 8/32
[52] U.S. Cl. ........................... 525/355; 260/29.6 HN; 525/327
[58] Field of Search ............................. 525/327, 355; 260/29.6 HN

[56] References Cited

U.S. PATENT DOCUMENTS

| | | | |
|---|---|---|---|
| 2,163,807 | 6/1939 | Piggott et al. | 260/404 |
| 3,228,823 | 1/1966 | Usala et al. | 161/186 |
| 3,290,416 | 12/1966 | Christenson et al. | 260/901 |
| 3,372,149 | 3/1968 | Fertig et al. | 260/78.4 |
| 3,538,185 | 11/1970 | Davis et al. | 260/837 |
| 3,705,076 | 12/1973 | Usala et al. | 161/189 |
| 3,711,435 | 1/1973 | Hammer et al. | 260/29.6 HN |
| 3,719,629 | 3/1973 | Martin et al. | 260/29.6 HN |

FOREIGN PATENT DOCUMENTS 1101758  1/1968  United Kingdom .

OTHER PUBLICATIONS

Dow Experimental Curing Agent XD-7080; Epoxy Resin News; Dow Chemical USA; No. 2, 1975.

*Primary Examiner*—William F. Hamrock

[57] ABSTRACT

Water-soluble acidified aminoalkylated interpolymers have enhanced properties when the pendant aminoalkylate groups are acidified with a mixture of hydrochloric acid and hydrobromic acid. In addition, coating compositions of such interpolymers, polyepoxides and water miscible solvents have improved cure rates when compared to compositions wherein the interpolymer is acidified with only one acid.

7 Claims, No Drawings

WATER THINNABLE COATING COMPOSITIONS FROM AMINOALKYLATED INTERPOLYMERS

CROSS-REFERENCE TO RELATED APPLICATION

This application is a continuation-in-part of our pending application Ser. No. 954,256, filed Oct. 24, 1978, now abandoned.

BACKGROUND OF THE INVENTION

Gloss coatings, such as enamels, are generally deposited from an organo solvent system. The current water thinned coating compositions available today are derived from either latexes or water-soluble alkyds. Such compositions have generally exhibited problems either in application characteristics or in the poor solvent/chemical residue appearance of the dried film. Consequently, enamel and other gloss coatings have continued to be deposited from oil systems. The disadvantages of oil coating systems are well known to anyone who has ever wielded a paint brush or roller. Not the least of those disadvantages is equipment, site and personal cleanup requiring liberal use of turpentine or similar odoriferous thinner. The widespread acceptance of aqueous coating systems whenever available attests to their desirability in the minds of the painter.

Water-dispersible epoxy coating compositions have been prepared using aminoethylated vinyl polymers acidified with hydrochloric acid or various monocarboxylic acids as a curing agent. Such compositions cure under ambient conditions when those conditions are warm and dry. However, they do not cure in acceptable times when the conditions are cool and/or damp as is a common occurrence when exterior coatings are to be applied. A need exists for a composition that will cure under adverse conditions.

SUMMARY OF THE INVENTION

The present invention is directed to aminoalkylated polymers that are made water soluble by acidification with hydrobromic acid or a mixture of hydrobromic acid and hydrochloric acid. The acidified polymers provide excellent cure rates for curing polyepoxides even in cold, wet weather.

DESCRIPTION OF THE INVENTION

The compositions of this invention are generally prepared by first preparing a vinyl carboxylic acid interpolymer, then reacting the carboxylic acid groups of the interpolymer with at least one mole of an N-(aminoalkyl) substituted alkylenimine or about 1.5 to 5 moles of an alkylenimine per equivalent of carboxylic acid at a temperature of 50° to 100° C., and, finally, forming the acid salt.

Polymerized vinyl interpolymers containing carboxylic acid groups are generally prepared from a solution of a mixture of monomers, one of which is a vinyl carboxylic acid monomer. The monomer mixture is polymerized in the presence of a catalyst and usually under controlled elevated temperatures with agitation until the polymerization reaction is complete. Various modifications commonly practiced with solution polymerization reactions can be utilized, modifications such as stepwise addition of the monomer mixture during the polymerization, incremental addition of catalyst, polymerization under an inert atmosphere, continuous or batch polymerization and the like. The details of such polymerization are well known and need not be discussed further herein.

Suitable vinyl carboxylic acid monomers include ethylenically unsaturated monocarboxylic acids such as methacrylic acid, atropic acid (alpha-phenyl acrylic acid), angelic acid (cis-2-methyl-2-butenoic acid) and tiglic acid (trans-2-methyl-2-butenoic acid). It is important that the carbon alpha to the carboxylic acid group bear no hydrogen atom. Preferably, the vinyl carboxylic acid is methacrylic acid.

The vinyl interpolymer is prepared by copolymerizing a vinyl carboxylic acid with one or more copolymerizable monomers such as vinyl aromatic monomers, alkyl esters of unsaturated monocarboxylic acids. dialkyl esters of unsaturated dicarboxylic acids, vinyl and vinylidene chloride and fluoride, N-vinyl pyrrolidone and the like.

Suitable vinyl aromatic monomers include styrene, α-methylstyrene, vinyl toluene, the various alkyl substituted styrenes, the various halo-substituted styrenes, vinyl naphthalene and the like. The more preferred of these monomers are styrene, α-methylstyrene and vinyl toluene. Suitable alkyl esters of unsaturated mono- and dicarboxylic acids include the esters prepared from aliphatic alcohols containing from 1 to 12 carbon atoms and from cyclohexyl alcohol with the vinyl carboxylic acids cited previously. The acrylic and methacrylic esters are preferred; most preferred of these monomers are methyl, ethyl, isopropyl, butyl and 2-ethylhexyl acrylates or methacrylates. Various amounts of acrylonitrile, or methacrylonitrile, less than about 40 percent, may also be used to improve the film properties.

The vinyl interpolymers are preferably prepared with a sufficient amount of a vinyl carboxylic acid monomer to provide from about 1 to about 20 percent by weight of carboxylic acid (as —COOH) and the balance of said interpolymer is comprised of one or more of the copolymerizable monomers. Preferably, the carboxylic acid content ranges from about 3 to 12 weight percent. Mixtures of vinyl aromatic monomers and alkyl esters of vinyl carboxylic acids may be advantageously used.

Suitable solvents for the polymerization include alcohols, glycols, glycol ethers, and the like or mixtures thereof. The polymerization temperature may range from 60° to 140° C., with a preferred range of 80° to 100° C. The particular temperature is variable depending on the monomers, the catalyst and other conditions.

The compositions of this invention are prepared by an amination reaction in which the vinyl carboxylic acid interpolymer in a suitable solvent is reacted with an excess of alkylenimine or an N-(aminoalkyl) substituted alkylenimine. Suitable alkylenimines include the 1,2-alkylenimines such as ethylenimine, propylenimine, butylenimine and the like and mixtures thereof. Ethylenimine is readily available in commercial quantities and is preferred. Also useful are the N-(aminoalkyl) substituted alkylenimines since they react similarly to the alkylenimines with a carboxylic acid group but are less volatile than the alkylenimines. Exemplary of these compounds are N-(2-aminoethyl) aziridine, N-(3-aminopropyl) aziridine, N-(2-aminopropyl) propylenimine, N-(2-aminobutyl) butylenimine and the like.

To obtain a plurality of amine groups per carboxylic acid group, at least 1.5 moles of an alkylenimine per equivalent of carboxylic acid are reacted with the organic solvent solution of the vinyl carboxylic acid interpolymer in order to obtain an average n value, according to the formula, of at least 1.5. Preferably, the number of moles of alkylenimine ranges from about 2 to about 5 giving an average n value of about 1.5 to 2.5. With the N-(aminoalkyl) alkylenimine, at least one mole, and preferably 1 to 1.5 moles, per equivalent of carboxylic acid is used.

The temperature of the amination reaction is best conducted above about 50° C. and preferably from about 50° to 100° C., although higher temperatures and superatmospheric pressures may be used.

After completion of the amination reaction, the solvent composition may be adjusted to comprise from 30 to 60 percent by weight of an alcohol solvent and from 70 to 40 percent by weight of a glycol ether. The final product may have a polymer concentration from 1 to 60 percent by weight depending on the polymer solubility and the particular application.

Other procedures for preparing the aminoalkyl interpolymer are known. One procedure is to treat a primary or secondary bromoalkyl acrylate with ammonia and interpolymerize the aminoalkylated monomer or to interpolymerize the bromoalkyl monomer and treat the polymer with ammonia. Another procedure is to interpolymerize the aminoalkyl acrylate or methacrylate hydrohalide, as, for example, 2-aminoethyl methacrylate. Still another procedure is to interpolymerize monomers with pendant glycidyl groups, as glycidyl acrylate, and to treat the polymer with excess ammonia at elevated temperature and applied pressure.

The aminoalkylated interpolymer is then acidified by simple mixing of the interpolymer and acids in a suitable water miscible solvent or solvent blend. Among such solvents are the lower alkyl ethers of ethylene, propylene, dipropylene and like glycols representative of which are the butyl ether of propylene glycol, the mono- or di-ethyl ether of ethylene glycol, the propyl ether of diethylene glycol, the methyl ether of dipropylene glycol and an isobutyl ether of mixed propylene glycols. Other solvents will be known.

The crux of this invention is the employment in the acidification of the pendant aminoalkyl groups of an acid containing at least 70 mole percent of hydrobromic acid with any remainder being hydrochloric acid.

The total acid may be an amount that will neutralize all of the amine groups and may be used in excess of or less than that amount. The minimum level to be used is that which will impart water dispersibility to the acidified aminoalkylated polymer.

The acidified polymers of this invention are utilizable as the pigment binder for coating compositions such as gloss enamels. Typically, such enamels will include the pigment binder, pigment and a liquid dispersing medium. The enamels may also include other materials commonly employed in such compositions such as extender pigments, viscosity adjusting agents, preservatives and the like.

In addition to gloss and semi-gloss enamels, the polymers may be employed in maintenance enamels, floor enamels, seamless flooring coatings, aircraft finishes, clear finishes and exterior house paint and trim enamels.

The coating compositions of this invention may be employed as formulated without pigments, or if colored coatings are desired, they may be added without detracting from the scope of the present invention.

The interpolymers of this invention may be used with epoxy resins to obtain cross-linked coatings exhibiting the desirable properties of such compositions.

Water-dispersible or thinnable epoxy resin coatings can be prepared by mixing the acidified aminoethylated interpolymers and the water-soluble aliphatic alcohol and glycol ether solvents discussed above with the desired epoxy resin.

The water-dispersible epoxy resin compositions of this invention may be conveniently formulated as two package or component systems wherein one package comprises the acidified aminoethylated polymer, water miscible solvents, water and, if desired, pigments, leveling agents, antifoam agents and other modifiers and the second package or component comprises the epoxy resin and, if desired, suitable water miscible solvents. Alternately, the second package can consist of a pigmented or nonpigmented emulsion of epoxy resin in water. When it is desired to apply the coating to the desired substrate, the contents of the two packages are blended together and the resultant mixture applied to the substrate by brushing, spraying, etc. The containers and applicator are then easily cleaned by washing with warm water.

A wide variety of polyepoxide resins may be readily made or are commercially available to prepare the coating compositions. One of the preferred classes of epoxy resins include the glycidyl polyethers of polyhydric phenols such as 4,4'-isopropylidene diphenol, commonly called bisphenol A. Other polyhydric phenols include resorcinol, catechol, hydroquinone, p,p'-dihydroxydiphenyl, p,p'-dihydroxy phenyl sulfone and the like. Flame retardant or self-extinguishing resins can be readily made from the halogen substituted, preferably bromine substituted, polyhydric phenols. The resins are generally made by reacting an epihalohydrin with the polyhydric phenol in the presence of a strong base. Typically, these resins contain more than one oxirane group,

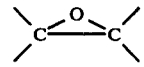

per molecule and the epoxide equivalent weight is defined as the weight in grams of the resin which contains one gram equivalent of epoxide.

Other polyepoxide resins which contain more than one epoxide group per molecule are glycidyl polyethers of polyhydric alcohols, glycidyl polyethers of novolac resins (commonly called epoxy novolacs) and a variety of resins wherein the epoxide group is introduced into the resin by the epoxidation of double bonds. The glycidyl polyethers of polyhydric phenols and polyhydric alcohols having an epoxide equivalent weight from about 150 to 2000 are preferred.

In addition to the polyepoxide resins described, vinyl polymers containing pendant glycidyl groups may also be utilized in this invention. Such vinyl glycidyl polymers may be made by copolymerizing a wide variety of vinyl monomers with a monomer such as glycidyl methacrylate. Suitable vinyl monomers include those which do not contain a group reactive with the glycidyl group and preferably include the α,β-ethylenically unsaturated carboxylic acid esters of saturated alcohols containing from 1 to about 8 carbon atoms and the monovinyl aromatic monomers of the benzene class such as styrene, vinyl toluene and the like. Preferably, the polymer contains from about 5 to about 50 percent by weight of the vinyl glycidyl monomer. Other suitable vinyl glycidyl monomers include allyl glycidyl ether, glycidyl acrylate, diglycidyl maleate and the like.

The epoxy resin coating compositions may vary considerably in solids content ranging from about 1 percent up to 40 or 50 weight percent depending upon the particular applications.

The epoxy resin coatings may be air dried at ambient temperatures or may be baked by conventional methods to harden and insolubilize them. It is a unique advantage of the aminoalkylated interpolymers as acidified herein that they cure epoxy resins under cool and damp conditions such as those that are encountered from time to time in applying exterior coatings. Interpolymers acidified only with hydrochloric acid or with mixtures with substantially less than 70 mole percent hydrobromic acid provide acceptable cure rates with epoxy resins only under favorable ambient conditions. That disadvantage limits the utilization of coating compositions in exterior applications.

The compositions of this invention also have acceptable application viscosity and as coatings show minimal flash rusting over unprimed steel and adequate resistance to corrosion, to solvents, to chemical attack and to ultraviolet light. Certain of them give no flash rusting whatsoever over unprimed steel.

The concept of the invention is illustrated in the following examples wherein all parts and percentages are by weight unless expressed otherwise.

EXAMPLE 1

An acrylic solution prepolymer was prepared as follows. To a mechanically stirred 5 liter Pyrex vessel was charged 1015 gms of 2-ethoxy ethanol. This was heated to 80°±1° C. with good stirring. From a feed vessel of appropriate size, a mixture of 307.5 gms of methyl methacrylate, 219 gms of methacrylic acid, 305 gms of styrene and 542.5 gms of butyl acrylate, all thoroughly mixed together, was fed at such a rate that the entire volume of liquid was added to the reactor in 4¼ hours. In another tank of appropriate size a slurry of 30 gms of azobis(isobutyronitrile) was made in 125 gms of 2-ethoxy ethanol. Taking the beginning of the monomer mixture feed to be t (time)=0, the slurry was added to the reactor in increments as follows:

| t, Minutes | Increment of Slurry, ml |
|---|---|
| 15 | 73.75 |
| 50 | 18 |
| 95 | 18 |
| 140 | 20 |
| 290 | 21 |
| 365 | 21 |

The entire mixture was stirred at 80°±1° C. until 10¼ hours after beginning the monomer mixture addition.

The solution polymer was cooled with good mechanical stirring to 62° C. From a separate feed reservoir (Pyrex) was then added 219 gms of ethylenimine over a period of 180 minutes and at a temperature of substantially 62° C. After 120 minutes more, 11.3 gms of 35 percent hydrochloride acid was added. One hour after this, the reaction mixture was cooled to 50° C., then 77.8 gms of 35 percent hydrochloric acid was added in 10 minutes. Following this, 562.5 grams of 49.2 percent hydrobromic acid (free of elemental bromine) was added in 50 minutes at 52° to 55° C. Forty minutes later the mixture was allowed to cool in the reactor.

The product of Example 1 is a light yellow transparent syrup which may be diluted indefinitely with water to yield clear solutions. Its viscosity at 25° C. is typically 18,000 cps. Amino nitrogen content is 1.8 to 1.9 percent, bromide (Br-) content is 7.4-7.6 percent and chloride (Cl—) is 0.80 to 0.90 percent. The total solution solids content is 56 to 57 percent. The interpolymer dries to a clear, resinous solid brittle at room temperature but soft when heated.

EXAMPLE 2

A coating composition was prepared by mixing 25 gms of the interpolymer identical to Example 1, 35 gms of water, 9.3 gms of the diglycidyl ether of bisphenol A (EEW=182-190), 1.7 gms of the diepoxide of a polyglycol (EEW=305-335) sold as DER 732 and 2.0 gms of the methyl ether of dipropylene glycol.

The coating compositions were coated on steel panels and maintained at 13° C. and 70 to 80 percent Relative Humidity (R.H.) for six hours. The panels were then held under cold running water for 30 seconds. The coating did not wash off.

A similar composition except using an interpolymer acidified only with hydrochloric acid, coated on panels and exposed as above, did wash off.

EXAMPLE 3

The same formulation as in Example 2 was coated on steel panels and exposed at 0° to 5° C. at 80 percent relative humidity for six hours. The coating prepared with the HBr neutralized interpolymer was water resistant while the HCl neutralized interpolymer did not give a water resistant coating.

The pot life of the HBr formulation was about six hours; the HCl formulation was about 24 hours.

EXAMPLE 4

Panels coated with the formulations of Example 2 were exposed outside at 4 p.m. at 35° F. 2.22° C.) and 100 percent relative humidity. The overnight low was 26° F. (−3.33° C.) At 8 a.m. the following morning, the HBr composition was water resistant; the HCl composition was not.

EXAMPLE 5

The interpolymers of Example 2 were prepared and accidified with various ratios of hydrobromic acid and hydrochloric acid. The amount of water was varied to equalize the viscosity. The compositions were coated on steel panels and subjected to two exposures: (a) outside exposure at 42° F. (6° C.) and 100 percent relative humidity and (b) inside exposure in a controlled chamber at 48° F. (9° C.) and 90 percent relative humidity.

The outside exposed panels were tested for water resistance after 6 hours exposure.

The inside exposed panels were tested for the amount of time under running water to failure up to 30 seconds.

The results were as follows:

| Mole % HBr/ Mole % HCl | 100/0 | 80/20 | 60/40 | 40/60 | 0/100 |
|---|---|---|---|---|---|
| Water (grams) | 41 | 38 | 36.5 | 35 | 35 |
| Outside Panels Inside | cured | cured | failed | failed | failed |

-continued

| Mole % HBr/ Mole % HCl | 100/0 | 80/20 | 60/40 | 40/60 | 0/100 |
|---|---|---|---|---|---|
| Panels (secs) | >30 | >30 | 22 | 15 | 7 |

EXAMPLE 6

Prepolymer Preparation

A 2 liter spherical Pyrex vessel was fitted for mechanical agitation, reflux, nitrogen purging, continuous reactants addition, temperature measurement and control, and sampling of the reaction mixture. After the vessel had been thoroughly $N_2$ purged, 335 gms of 2-ethoxyethanol was charged and heated with stirring to 80.0°±0.1° C. To this was added 2.5 gms of tert-dodecyl mercaptan and the reactor was closed.

The following mixture was made up and charged to a feed reservoir: styrene, 150 gms; n-butyl methacrylate, 125 gms; 2-ethylhexyl acrylate, 125 gms; methacrylic acid, 100 gms; and azobis(isobutyronitrile), 10.0 gms. The feed reservoir was attached to the reactor through a motor driven syringe pump, and by this means the monomer/initiator solution was added to the hot solvent/mercaptan mixture over a period of three hours and two minutes, at a uniform feed rate throughout and at 80.0°±0.1° C. reactor temperature.

A quarter hour after the addition was completed, the reaction mixture temperature was raised to 90.0°±0.1° C., and two hours after that, to 100.0°±0.1° C., where it was held for an additional seven hours and fifty minutes. The mixture was then allowed to cool overnight with stirring.

The next day, 238 gms of 2-ethoxyethanol was added and thoroughly stirred into the polymer solution to thin it. A small sample was then taken and analyzed by gas chromatography for residual monomer content. The results were as follows:

| Monomer | Concentration, Wt. % |
|---|---|
| Styrene | <.05 |
| n-Butyl methacrylate | Interference |
| 2-Ethylhexyl acrylate | 1.1 |
| Methacrylic Acid | <0.1 |

The prepolymer was a clear, colorless syrup.

Aminoethylation of Prepolymer

The above solution was reheated to 80.0° C., and from a small glass addition funnel, 75 gms of ethylenimine was added over a period of thirty-one minutes. During this time, the temperature rose spontaneously to 88.9° C. and cooling was required. The temperature was then held at 80.0° C. for one hour, at the end of which 15 milliliters of the following mixture was added: 36 percent hydrochloric acid, 28 gms and 49 percent hydrobromic acid, 184 gms. After one and a half more hours at 80° C., more of the acid mixture was added slowly until 72 ml, or half the total, had been added. A sample at this point was fully water soluble and had a bulk pH of about 7.0. More acid mixture was added until a total of 120 ml, or 83 percent of the above recipe, had been added. The polymer solution was then bottled.

Its physical properties were:

| Bulk pH | 5.5 |
|---|---|
| Color | 3-4, Gardner |
| % Non-volatiles | 50.0 |
| Dilute viscosity[1] | 5000 cps |

[1] diluted to 21.3% non-volatiles with water

EXAMPLE 7

In a manner essentially identical to Example 6, the following mixture was polymerized in the same solvent/mercaptan mixture: n-butyl methacrylate, 250 gms; methacrylonitrile, 150 gms; methacrylic acid, 100 gms; and azobis(isobutyronitrile), 10.0 gms. The monomer/initiator feed was completed in three hours and four minutes at a reaction temperature of 90.0°±0.1° C. Two hours later the temperature was increased to 95° C., and one hour and eight minutes later to 100° C. Twenty-five minutes after that, 10.0 ml of a liquid azo initiator, N-(tert-butyl) azoisobutyronitrile ($Me_3C-N=N-CMe_2-CN$), was added. Six hours and forty minutes later heating at 100° C. was stopped, and the mixture was cooled overnight with stirring.

The next morning 238 gms of 2-ethoxyethanol was stirred in, and a sample analyzed by gas chromatography contained 0.38 percent methacrylonitrile and <0.1 percent methacrylic acid.

The prepolymer was aminoethylated by adding to it over a twenty-seven minute period, 100 gms of ethylenimine at a temperature of 70°-88° C. After one hour more at 80.0° C., 10.0 ml of a mixture of 24 gms of 36 percent hydrochloric acid and 154 gms of 49 percent hydrobromic acid was added to the reactor. After one hour and thirteen minutes more at 80.0° C., the reactor was cooled to 55.3° C., and the balance of the acid mixture was added in eight minutes. The resulting resin was fully water soluble.

EXAMPLE 8

In a manner essentially identical to Example 6, the following mixture was polymerized in the same solvent/mercaptan mixture: styrene, 200 gms; n-butyl methacrylate, 100 gms; 2-ethylhexyl acrylate, 100 gms; and methacrylic acid, 100 gms. This mixture was added uniformly to the reactor over a period of three hours at 95.0°±0.2° C. During this time, 10.0 gms (11.7 ml) of N-(tert-butyl) azoisobutyronitrile was added in increments from a burette according to the following schedule, in which t (time)=0 represents the beginning of the monomer feed; about 0.80 milliliter catalyst was added every 15 minutes up to 165 minutes with the remainder as follows:

| t, Minutes | Vol. of Initiator Added |
|---|---|
| 195 | .80 |
| 225 | .90 |
| 285 | 1.00 |
| 405 | 1.00 |

Two hours and forty-five minutes after the monomer addition was completed, the temperature was increased to 100.0° C.; 30 minutes later, to 105° C.; and 30 minutes after that, to 110° C., where it was held for eight and one-half hours.

The next morning the polymer solution was thinned by stirring in 238 gms of n-propanol. By gas chromatography, the solution was found to have the following residual monomer content:

| Styrene | <0.05% |
|---|---|
| n-Butyl methacrylate | interference |
| 2-Ethylhexyl acrylate | 0.30 |
| Methacrylic acid | <0.1 |

The thinner resin solution was next heated to 71° C., and 100 gms of ethylenimine was added over a period of 39 minutes. The mixture was then stirred for one hour at 80° C., and at the end of this time, 10.0 ml. of a mixture of 24 gms of 36 percent hydrochloric acid and 154 gms of 49 percent hydrobromic acid was added. One hour later heating was stopped and the reactor was cooled from 80° to 41° C., then the balance of the acid mixture was added. The resulting heterogeneous mixture was stirred at 70° C. until all solid particles had disappeared, then it was bottled. Its physical properties were as follows:

| Property | Value |
|---|---|
| Appearance | Clear, light yellow |
| Bulk pH | 6.93 |
| Dilute pH[1] | 6.81 |
| Viscosity | 13,000 cps |
| % Non-volatiles | 50 |

[1] one part dissolved in three parts of water, by weight.

EXAMPLE 9

Three copolymer resins were prepared at three polymerization temperatures using the recipe weights shown below:

| Component | Weight of Component (gms) | | |
|---|---|---|---|
| | A | B | C |
| Butyl acrylate | 217 | 217 | 217 |
| Methyl methacrylate | 123 | 123 | 123 |
| Styrene | 122 | 122 | 122 |
| Methacrylic acid | 87.6 | 87.6 | 87.6 |
| 2-Ethoxyethanol | 50 | — | — |
| Azobis(isobutyonitrile) | 12 | — | — |
| 2-Ethoxyethanol | — | 50 | 50 |
| N-(Tert-butyl)azo-isobutyronitile | — | 12 | 12 |
| Ethylenimine | 87.6 | 87.6 | 87.6 |
| 36% Hydrochloric acid | 34.4 | 34.4 | 34.4 |
| 49% Hydrobromic acid | 225 | 225 | 225 |
| 2-Ethoxyethanol | 406 | 406 | 406 |
| Polymerization temp. | 90° C. | 90° C. | 100° C. |

In all three cases, the 406 gms of 2-ethoxyethanol was charged to the reactor and heated to the polymerization temperature, and the mixture of monomers was fed in over a 4–4½ hour period. The mixture of 2-ethoxyethanol and azo initiator was added in increments as in Example 1; the aminoethylation was carried out at 62° C. with an ethylenimine feed time of 3–3½ hours, and a post-feed digestion and neutralization as in Example 1.

All three solution polymers were clear, yellow syrups, completely miscible in water.

The resins of Examples 6–9 were evaluated as follows:

EXAMPLE 10

Coating formulations of the resins in Examples 6 and 7 were made as described below:

| Amino acrylate resin | 25.0 gms |
|---|---|
| Water | 45.0 gms |
| Diglycidyl ether of bisphenol A (EEW = 182–190) | 9.3 gms |
| A polyglycol diepoxide sold as DER ® 732 | 1.7 gms |
| Methyl ether of dipropylene glycol | 2.0 gms |

Films were cast on aluminum panels using a 6 ml Bird gauge. Panels were cured at ambient humidity and temperature (about 77° F. and 50 percent R.H.) and at 45°–50° F. and 85–95 percent R.H. After 6 hours, both resins were tested for water resistance as in Example 5. The resin from Example 6 exposed at 45°–50° F. and 85–90 percent R.H. was partially washed away after 30 seconds and by this test would be nearly water resistant. The panel with resin 7 was washed away after 23 seconds of testing.

Both panels exposed at 77° F. and 50 percent R.H. were completely water resistant after 6 hours cure (i.e., 30 seconds of running water had no effect).

EXAMPLE 11

The product of Example 8 was formulated as outlined in Example 10. Exposure was at about 77° F. and 50 percent R.H. for 5 hours and at 45°–50° F. and 85–90 percent R.H. After 5 hours, both panels were completely water resistant (i.e., 30 seconds of running water had no effect).

EXAMPLE 12

The three resins prepared in Example 9 were directly compared to a hydrochloric acid neutralized, aminoethylated interpolymer of a similar nature. Coatings were prepared as in Example 10 and cured at 77° F. and 50 percent R.H. and at 45°–50° F. and 80–90 percent R.H. After 24 hours at ambient temperature, all four coatings were water resistant (after 30 seconds under running water no coating was removed) but the hydrochloric acid neutralized polymer had severely softened due to water absorption. All three resins of Example 9 retained their original hardness.

The panels cured at 45°–50° F. and 80–90 percent R.H. showed greater variation when checked for water resistance. The chloride neutralized polymer was water soluble, dissolving in 7 seconds. All three resins from Example 9 were totally unaffected by 30 second water exposure.

EXAMPLE 13

Another way of measuring the increased reactivity of this invention is by comparing the usable pot life of the formulated coating. Those polymers which embody the improvement described herein demonstrate increased reactivity and shorter pot life. The polymers neutralized with hydrochloric acid or other acids (as taught in U.S. Pat. No. 3,719,629) have longer pot lives. The following table demonstrates the differences.

| Polymer | Pot Life (hrs) |
|---|---|
| Chloride neutralized polymer in Example 12 | ~24 |
| Example polymers in U.S. Pat. No. 3,719,629 | ~18–36 |
| Polymers from this disclosure | ~6 |
| Example 1 | ~6 |

-continued

| Polymer | Pot Life (hrs) |
| --- | --- |
| Example 6 | ~6 |
| Example 7 | ~6 |
| Example 9-A | ~6 |
| 9-B | ~6 |
| 9-C | ~6 |
| Example 8 | 2½–3 |

It was observed that the panels coated with the aminoethylated interpolymer acidified with 100 mole percent hydrobromic acid developed rust spots which were water sensitive. The panels coated with the aminoethylated interpolymer neutralized with 80 mole percent hydrbromic acid and 20 mole percent hydrochloric acid did not develop rust spots.

What is claimed:

1. In a water soluble acidified aminoalkylated vinyl carboxylic acid interpolymer, said interpolymer before acidification having pendant aminoalkyl groups of the formula:

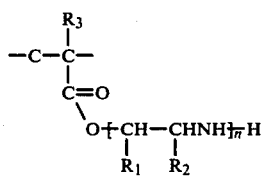

wherein $R_1$ and $R_2$ are independently selected from the group consisting of hydrogen and lower alkyl radicals of one to four carbon atoms and the average value of n is from about 1 to 3.5; $R_3$ is phenyl or lower alkyl and wherein said interpolymer before aminoethylation contains at least 3 weight percent pendant carboxyl groups and further wherein said interpolymer is acidifed with sufficient acid to impart water solubility thereto, the improvement wherein said aminoalkylated interpolymer is acidifed with a mixture of hydrochloric acid and at least 70 mole percent hydrobromic acid based on the total amount of acid added.

2. The interpolymer of claim 1 wherein the ratio of acids is 80 mole percent hydrobromic acid and 20 mole percent hydrochloric acid.

3. The interpolymer of claim 1 wherein the average value of n is 1.8 to 1.9.

4. The interpolymer of claim 1 wherein the polymer prior to acidification contains from 5 to 15 percent by weight of pendant carboxyl groups.

5. The interpolymer of claim 1 wherein at least 80 percent of the carboxyl groups are aminoalkylated.

6. The interpolymer of claim 5 wherein the aminoalkyl group is aminoethyl.

7. The interpolymer of claim 1 wherein the polymer prior to aminoalkylation is an interpolymer of one or more monomers selected from the groups consisting of an alkyl acrylate, an alkyl methacrylate wherein the alkyl group contains from 1 to 8 carbon atoms, styrene, or vinyl toluene interpolymerized with methacrylic acid.

* * * * *